United States Patent
Kubota et al.

(10) Patent No.: US 7,754,029 B2
(45) Date of Patent: Jul. 13, 2010

(54) STEEL WITH EXCELLENT DELAYED FRACTURE RESISTANCE AND TENSILE STRENGTH OF 1801 MPA CLASS OR MORE, AND ITS SHAPED ARTICLE

(75) Inventors: Manabu Kubota, Futtsu (JP); Suguru Yoshida, Futtsu (JP); Toshimi Tarui, Futtsu (JP); Hideki Matsuda, Wako (JP); Koki Mizuno, Wako (JP); Tadashi Ohya, Wako (JP)

(73) Assignees: Nippon Steel Corporation, Tokyo (JP); Honda Motor Co., Ltd., Tokyo (JP)

( * ) Notice: Subject to any disclaimer, the term of this patent is extended or adjusted under 35 U.S.C. 154(b) by 91 days.

(21) Appl. No.: 11/490,955

(22) Filed: Jul. 21, 2006

(65) Prior Publication Data

US 2007/0017609 A1   Jan. 25, 2007

(30) Foreign Application Priority Data

Jul. 22, 2005   (JP) .............................. 2005-212215

(51) Int. Cl.
- *C22C 38/12* (2006.01)
- *C22C 38/16* (2006.01)
- *C22C 38/04* (2006.01)
- *C22C 38/06* (2006.01)

(52) U.S. Cl. ....................... 148/320; 148/328; 148/334; 148/335; 148/336

(58) Field of Classification Search ................. 420/105, 420/106, 108–111, 123, 124, 125; 149/320, 149/334–335, 587; 148/320, 334–336, 328, 148/587, 663

See application file for complete search history.

(56) References Cited

FOREIGN PATENT DOCUMENTS

| EP | 1598437 | 11/2005 |
|---|---|---|
| GB | 1434948 | 5/1976 |
| JP | 55-2785 | * 1/1980 |
| JP | 64-052045 | 2/1989 |
| JP | 05-148576 | 6/1993 |
| JP | 05-148580 | 6/1993 |
| JP | 2000328191 | 11/2000 |
| JP | 2001032044 | 2/2001 |
| JP | 2002-173739 | * 6/2002 |
| JP | 2004 231992 | 8/2004 |

OTHER PUBLICATIONS

Computer-generated English translation of Japanese patent 2002-173739, Hiragami et al. Jun. 21, 2002.*
Kubota, M. et al., "Development of High Tensile Strength Steel for Bolts," equivalent to *Tetsu-to-Hagane*, vol. 83 (1997), p. 454.

* cited by examiner

*Primary Examiner*—Deborah Yee
(74) *Attorney, Agent, or Firm*—Kenyon & Kenyon LLP

(57) ABSTRACT

Steel and steel shaped articles with an excellent delayed fracture resistance and a tensile strength of the 1600 MPa class or more, containing, by mass %, C: 0.20 to 0.60%, Si: 0.50% or less, Mn: over 0.10% to 3%, Al: 0.005 to 0.1%, Mo: over 3.0% to 10%, and, as needed, one or more of W: 0.01 to 10%, V: 0.05 to 1%, Ti: 0.01 to 1%, Nb: 0.01 to 1%, Cr: 0.10 to 2%, Ni: 0.05 to 1%, Cu: 0.05 to 0.5%, and B: 0.0003 to 0.01%, and a balance of Fe and unavoidable impurities and, further, a method of production comprising shaping the above steel to a desired shape (for example, a bolt shape), quenching it, then tempering it at 500 to 750° C. in temperature range.

9 Claims, 1 Drawing Sheet

STEEL WITH EXCELLENT DELAYED FRACTURE RESISTANCE AND TENSILE STRENGTH OF 1801 MPA CLASS OR MORE, AND ITS SHAPED ARTICLE

BACKGROUND OF THE INVENTION

1. Field of the Invention

The present invention relates to steel with excellent delayed fracture resistance, its shaped articles, and methods of production of the same, more particularly relates to steel with excellent delayed fracture resistance suitable for the production of high strength bolts of a tensile strength of 1600 MPa or higher, its shaped articles, and methods of production of the same.

2. Description of the Related Art

The improvement of performance and reduction of weight of automobiles and industrial machinery and the increasingly larger size of building structures have led to demands for development of steel for higher strength bolts.

The types of steel being currently generally used for high strength bolts are the JIS standard SCM435, SCR435, and other low alloy steel produced accompanied by quenching and tempering. However, these types of steel decrease in delayed fracture resistance when the tensile strength exceeds 1200 MPa, so the risk of breakage due to delayed fracture during use of the bolts increases. Therefore, increase of the strength to this level and higher has been impossible in practice.

Steel for high strength bolts designed to improve the delayed fracture resistance are being proposed by various companies. For example, Japanese Patent Publication (A) No. 5-148576 and Japanese Patent Publication (A) No. 5-148580 describe to prevent the light carburization and grain boundary oxidation occurring during heat treatment of bolts and to increase the amount of Mo to improve the tempering softening resistance so as to improve the delayed fracture resistance.

Further, for example Japanese Patent No. 2739713 describes an invention complexly adding Mo and V to prevent the formation of $Fe_3C$ and thereby improve the delayed fracture resistance of 1400 MPa class bolts.

Further, for example, Japanese Patent Publication (A) No. 2001-32044 describes an invention adding a relatively large amount of Mo and performing high temperature tempering so as to improve the delayed fracture resistance of 1500 MPa class and higher bolts. This is art effective for improving the delayed fracture resistance of bolts with tensile strengths of about 1500 to 1700 MPa.

SUMMARY OF THE INVENTION

However, when the invention described in the above Japanese Patent Publication (A) No. 5-148576 or Japanese Patent Publication (A) No. 5-148580 is applied to 1500 MPa class or higher high strength bolts, the delayed fracture resistance becomes insufficient and practical use becomes difficult. Further, the optimum range of the tempering temperature is also not shown. Even the maximum value of the tensile strength shown in the examples is only 147.0 $kgf/mm^2$ (1441 MPa).

Further, in the invention described in Japanese Patent No. 2739713, when applied to 1600 MPa class or higher high strength bolts, the delayed fracture resistance can no longer be said to be sufficient and practical application is difficult. Further, the optimum range of the tempering temperature is also not shown. Even the maximum value of the tensile strength described in the examples is only 158.7 $kgf/mm^2$ (1555 MPa).

Further, from the viewpoint of the reduction of weight and improvement of performance of building structures and machine parts, the higher the strength level of a bolt the better, but when further higher strength of the 1600 to 2000 MPa plus class is required, for example, above 1700 MPa, the invention described in the above Japanese Patent Publication (A) No. 2001-32044 is not sufficient. Further, even in the 1600 to 1700 MPa strength region, if the external environment is severe, the delayed fracture resistance decreases, so 1600 to 2000 MPa plus strength level high strength bolts have not yet been practically provided.

As explained above, a high strength bolt having a 1600 to 2000 MPa plus strength level and excellent in delayed fracture resistance cannot be found at the present.

SUMMARY OF THE INVENTION

Therefore, the present invention has as its object to advantageously solve the above problem and provide steel with excellent delayed fracture resistance and its shaped articles and methods of production of the same. In particular, it has as its object to provide steel more excellent in delayed fracture resistance than even the SCM435 currently widely used for 1000 MPa class bolts even at a high strength of a tensile strength of over 1600 MPa and its shaped articles and methods of production of the same.

The present invention has as its gist the following:

(1) Steel with an excellent delayed fracture resistance and a tensile strength of the 1600 MPa class or more containing, by mass %, C: 0.20 to 0.60%, Si: 0.50% or less, Mn: over 0.10% to 3%, Al: 0.005 to 0.1%, Mo: over 3.0% to 10%, and the balance of Fe and unavoidable impurities.

(2) Steel with an excellent delayed fracture resistance and a tensile strength of the 1600 MPa class or more as set forth in the above (1), further containing, by mass %, one or more of W: 0.01 to 10%, V: 0.05 to 1%, Ti: 0.01 to 1%, and Nb: 0.01 to 1%.

(3) Steel with an excellent delayed fracture resistance and a tensile strength of the 1600 MPa class or more as set forth in the above (1) or (2), further containing, by mass %, one or more of Cr: 0.10 to 2%, Ni: 0.05 to 1%, Cu: 0.05 to 0.5%, and B: 0.0003 to 0.01%.

(4) A high strength bolt with an excellent delayed fracture resistance and a tensile strength of the 1600 MPa class or more having the steel ingredients as set forth in any one of the above (1) to (3) and exhibiting a quenched and tempered structure as a microstructure.

(5) A method of production of a steel shaped article with excellent delayed fracture resistance and a tensile strength of the 1600 MPa class or more the above comprising shaping a steel as set forth in any one of the above (1) to (3) to a desired shape, then quenching it and thereafter tempering it at 500 to 750° C. in temperature range.

(6) A method of production of a steel shaped article with excellent delayed fracture resistance and a tensile strength of the 1600 MPa class or more as set forth in the above (5), wherein the desired shape is a bolt shape.

According to the present invention, it becomes possible to provide steel and steel shaped articles such as bolts having a high strength of a tensile strength of the 1600 MPa class or more and excellent in delayed fracture resistance. For example, the bolts according to the present invention are increased in fastening axial force and reduced in size and thereby reduced in weight etc. so can greatly contribute to the reduction in weight and improvement of performance of buildings and machine parts etc. The effects of the present invention are extremely large.

DESCRIPTION OF THE PREFERRED EMBODIMENTS

Figure 1:
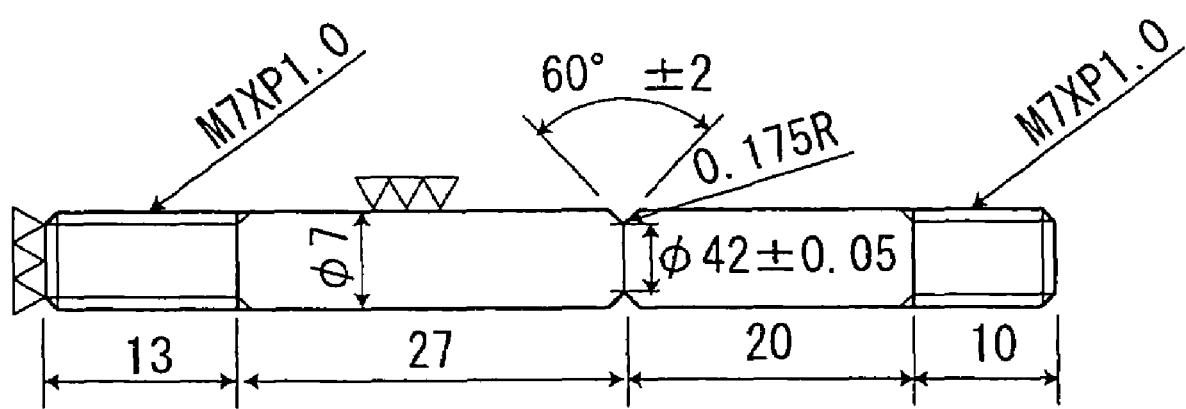
FIG. 1 is a view for briefly explaining a delayed fracture test piece with a ring-shaped cut notch for confirming the effect of the present invention.

The inventors intensively studied the various factors affecting the delayed fracture characteristics and discovered the following: That is, (1) The tempering temperature has a large effect on the delayed fracture properties of the high strength steel. If comparing the delayed fracture resistances of steel materials having the same tensile strength, the higher the tempering temperature, the better the delayed fracture resistance. This is because the higher the tempering temperature, the more spherical the shape of the cementite precipitating at the former austenite grain boundaries and the greater the bonding strength of the grain boundaries and because the density of the dislocations and other defects in the matrix is reduced and the susceptibility to embrittlement caused by hydrogen decreases.

(2) To make the delayed fracture resistance of 1600 MPa class or higher high strength steel about the same extent as the delayed fracture resistance of the currently widely used 1000 MPa class SCM435, the tempering temperature has to be set to at least 500° C.

(3) To set the tempering temperature to the above temperature range and obtain a 1600 MPa class or higher strength, it is effective to add a much greater amount (over 3%) of Mo than conventional steel and make maximum use of the precipitation strengthening by the Mo carbides at the time of tempering. This is because Mo is larger in solubility in austenite compared with other alloy elements (Nb, Ti, V, etc.) giving precipitation strengthening by precipitation of alloy carbides and can be dissolved in large amounts in the matrix at the time of the heating in quenching heat treatment (below, simply referred to as "quenching heating"), so is extremely advantageous for obtaining large precipitation strengthening at the time of tempering. Further, addition of a large amount of Mo sometimes results in Mo carbides remaining undissolved at the time of quenching heating, but even if undissolved Mo carbides remain, there is little detrimental effect on the delayed fracture properties, so there is little harm to addition of a large amount of Mo. Further, if adding V and W in combination together with Mo and utilizing the precipitation strengthening of V and W carbides, a greater effect is obtained. Note that so long as the desired tensile strength is obtained, the higher the tempering temperature, the better the delayed fracture resistance, so if raising the tempering temperature and adjusting the tensile strength to the low side, a further better delayed fracture resistance can be obtained.

(4) By limiting the amounts of the P and S impurities segregating at the grain boundaries to certain amounts or less, the former austenite grain boundaries are strengthened and the delayed fracture resistance is improved.

(5) By sharply reducing the Si solid solution strengthening element of ferrite, the drop in the cold forgeability due to the addition of a large amount of Mo can be compensated for and the strength can be increased without detracting from the cold forgeability of the bolts.

Below, the present invention will be explained in more detail.

C: C is an element effective for obtaining strength, so 0.20% or more is added, but if over 0.60% is added, the cold forgeability, toughness, and delayed fracture resistance fall, so 0.20 to 0.60% in range has to be set. The preferable range, from the balance of strength, cold forgeability, toughness, and delayed fracture resistance, is 0.30 to 0.45%.

Mn: Mn is an element effective for improving the hardenability. Also, it immobilizes the S in the steel as MnS to thereby prevent hot brittleness. Further, reducing the A3 point cancels out the rise in the quenching heating temperature (austenite transformation temperature) due to the addition of a large amount of Mo and thereby has the effect of preventing the coarsening of the grains and the drop in the manufacturing ability, so over 0.10% is added, but if over 3% is added, the delayed fracture resistance and the cold forgeability fall, so over 0.10% to 3% in range has to be set. The preferable range, from the balance of the hardenability, delayed fracture resistance, and cold forgeability, is 0.30 to 1.5%.

Mo: Mo is an element causing remarkable secondary hardening due to the precipitation of fine Mo carbides at the time of tempering and enabling high temperature tempering so as to remarkably improve the delayed fracture resistance. In the 500° C. or higher tempering temperature range, the precipitation hardening of Mo carbonitrides gives a 1600 MPa class or higher strength, so Mo has to be added in an amount over 3.0%, but if over 10% is added, the effect becomes saturated and just the cost of the material is raised. Therefore, over 3.0% to 10% in range has to be set. The preferable range, from the balance of the secondary hardening and the rise in the cost of the material, is 3.1 to 6.0%.

Al: Al is an element required for the deoxidation of steel and has the effect of forming nitrides to make the pre-austenite grains finer, so 0.005% or more is added, but if over 0.1% is added, not only does the effect become saturated, but also the alumina-based inclusions increase and the toughness falls, so 0.005 to 0.1% in range has to be set. The preferable range, from the balance of the increased fineness of the former austenite grains and the increase in inclusions, is 0.010 to 0.050%.

Si: Si is an element effective for deoxidation of steel, but if over 0.50% is added, the cold forgeability remarkably falls, so it must be limited to 0.50% or less. The preferable range, from the viewpoint of cold forgeability, is 0.10% or less.

W: W has effects similar to Mo, so as needed, 0.01% or more is added, but if over 10% is added, the effect becomes saturated and just the cost of the material is raised, so 0.01 to 10% in range has to be set. The preferable range, from the balance of the secondary hardening and rise in cost of the material, is 0.5 to 3.0%.

V: V has the effect of making the pre-austenite grains finer. It is an element causing remarkable secondary hardening at the time of tempering and enabling high temperature tempering to thereby improve the delayed fracture resistance, so in accordance with need, 0.05% or more is added, but if over 1% is added, the effect becomes saturated and just the cost of the material is raised, so 0.05 to 1% in range has to be set. The preferable range, from the balance of the increased fineness of the former austenite grains, secondary hardening, and rise in cost of the material, is 0.10 to 0.35%.

Ti: Ti, like Al, Nb, and V, has the effect of increasing the fineness of the grains, Further, it has the effect of immobilizing the solute N in the steel as nitrides and improving the delayed fracture resistance, so, in accordance with need, 0.01% or more is added, but if over 1% is added, not only does the effect become saturated, but also the cold forgeability falls, so 0.01 to 1% in range has to be set. The preferable range, from the balance of the increased fineness of the former austenite grains and the cold forgeability, is 0.01 to 0.05%.

Nb: Nb, in the same way as Al, Ti, and V, has the effect of making the grains finer, so in accordance with need, 0.01% or more is added, but if over 1% is added, not only does the effect become saturated, but also the cold forgeability falls, so 0.01 to 1% in range has to be set. The preferable range, from the balance of the increased fineness of the former austenite grains and the cold forgeability, is 0.01 to 0.05%.

Cr: Cr is an element effective for improving the hardenability. Further, it has the effect of imparting tempering softening resistance to the steel. Therefore, in accordance with need, 0.10% or more is added, but if over 2% is added, the cold forgeability falls, so 0.10 to 2% in range has to be set.

Ni: Ni is an element which improves the toughness, which deteriorates along with increased strength, and improves the corrosion resistance, so in accordance with need, 0.05% or more is added, but even if over 1% is added, an effect commensurate with the amount of addition is not obtained, so 0.05 to 1% in range has to be set. The preferable range, from the balance of the improvement of the ductility and the corrosion resistance and the rise in the cost of the material, is 0.30 to 0.70%.

Cu: Cu is an element improving the corrosion resistance depending on the environment, so in accordance with need 0.05% or more is added, but if over 0.5% is added, the hot workability falls and the manufacturability of the steel falls, so 0.05 to 0.5% in range has to be set. The preferable range, from the balance of the improvement in the corrosion resistance and the drop in the hot workability, is 0.10 to 0.30%.

B: B, in a small amount of addition, has the effect of improving the hardenability. Further, it segregates at the pre-austenite grain boundaries to strengthen the grain boundaries and improve the delayed fracture resistance, so is added according to need in an amount of 0.0003% or more, but if over 0.01% is added, the effect becomes saturated, so 0.0003 to 0.01% in range has to be set. The preferable range, for neither excessively or insufficiently improving the hardenability, is 0.0010 to 0.0030%.

Regarding P and S, the present invention does not limit their contents, but the P and S in steel are elements reducing the delayed fracture resistance, so should be reduced as much as possible. The preferable ranges are 0.010% or less.

Regarding the N, the present invention does not particularly limit it in content, but usually steel contains 20 to 150 ppm or so of N. In the case of a system of ingredients like in the present invention where the amounts of addition of the alloy elements are relatively large, sometimes the heating temperature at the time of the quenching heating is set higher than usual for solution treatment of the alloy carbides, but if raising the temperature, the grains become coarser and the mechanical properties may be impaired. In this case, to prevent coarsening of the grains, it is sufficient to positively add the Ti and N to form TiN to promote increased fineness. The preferable range of N in this case is 0.0080 to 0.0150%. When increasing the fineness of the grains by TiN is not required, the N content may be made smaller than the above range.

Regarding O, the present invention does not particularly limit it in content, but if the O content is large, $Al_2O_3$ and other inclusions increase and sometimes form the starting points for cracking when performing cold forging, so the content is preferably reduced as much as possible. The preferable range is 0.0015% or less.

The present invention does not particularly limit the manufacturing processes, but for parts requiring a cold forging step during the production of the parts, the cold forgeability may be improved by annealing or spheroidization annealing the material after hot rolling. Further, in the case of bolts requiring dimensional precision of the material, the general practice is to apply drawing before cold forging.

The method of production of steel explained below is most effective for obtaining the steel of the above ingredients.

The steel of the above ingredients is forged, cut, etc. to shape it to the desired shape, then the steel is given strength by heating it to the $A_{c3}$ point or a higher temperature, and water cooling or oil cooling it for quenching. If the heating temperature is too low, the solution treatment of the Mo, W, and V carbides becomes insufficient, precipitation strengthening is not obtained at the time of tempering, and therefore the desired properties cannot be obtained. On the other hand, if the heating temperature is too high, coarsening of the grains is invited and deterioration of the toughness and delayed fracture resistance is incurred. Further, from the operational aspects, the furnace for heat treatment and its accessory parts become seriously damaged and the manufacturing costs rise. Therefore, heating to too high a temperature is not preferable. In the range of ingredients of the present invention, the quenching heating temperature should be set to 900 to 1150° C.

To give the steel a predetermined strength, toughness, and ductility, tempering is necessary after the quenching. Tempering is generally performed at 150° C. to the $A_{c1}$ point in temperature range, but the present invention has to limit this to 500° C. to 750° C. in temperature range. The reason is that if less than 500° C., the cementite precipitating at the grain boundaries becomes spheroidal in shape and therefore the bonding strength of the grain boundaries cannot be increased and the delayed fracture resistance cannot be made equal to or better than the 1000 MPa class of the SCM435. Further, the precipitation strengthening due to the Mo, V, and W carbides at the time of tempering is remarkably manifested at 500° C. or more. On the other hand, if the tempering temperature is over 750° C., the carbides become coarser and precipitation strengthening is no longer contributed to, so obtaining a 1600 MPa class or more tensile strength is difficult. The preferable range is 550 to 650° C. where the delayed fracture resistance can be improved and a high tensile strength can be obtained.

Note that the present invention gives steel of a tensile strength of the 1600 MPa class or more and excellent delayed fracture resistance and their shaped articles (for example, high strength bolts). So long as the desired tensile strength is obtained, the higher the tempering temperature, the better the delayed fracture resistance. Therefore, if raising the tempering temperature and adjusting the tensile strength to the low side, a delayed fracture resistance more excellent that that of the conventionally proposed high strength steel (for example, the invention described in Japanese Patent Publication (A) No. 2001-32044) is obtained.

EXAMPLES

Below, examples will be used to further explain the present invention.

Converter molten steels having the compositions of ingredients shown in Table 1 were continuously cast and, in accordance with need, subjected to soaking and diffusion and to blooming to obtain 162 mm square rolled materials. Next, these were hot rolled to round in section. The steel codes A to N in Table 1 are steels of the present invention, while the rest are comparative steels.

Next, bolts were prepared to investigate the delayed fracture properties of these materials. The rolled materials were annealed or spheroidization annealed in accordance with need and then cold forged to form the shapes of bolts. After this, the bolts were heated under predetermined conditions, quenched in an oil tank, and tempered under the conditions of Table 2. Nos. 1 to 16 in Table 2 are examples of the present invention, while the rest are comparative examples. From the bolts fabricated by the above-mentioned process, tensile test pieces based on the JIS Z 2201 4 test piece and delayed fracture test pieces with the ring-shaped cut notches shown in FIG. 1 were fabricated by machining and were examined for mechanical properties and delayed fracture properties. The delayed fracture test was performed using the critical diffusable hydrogen amount described in *Tetsu-to-Hagane*, Vol. 83 (1997), p. 454. Samples having a critical diffusable hydrogen amount of 0.5 ppm or less were judged to be inferior in delayed fracture characteristics. As clear from Table 2, the examples of the present invention all had a tempering temperature of 500° C. or more, a tensile strength of the 1600 MPa class or more, and a critical diffusable hydrogen amount of 0.5 ppm or more, so regardless of the high strength, were excellent in delayed fracture properties. As opposed to this, the comparative example of No. 17 has steel ingredients of the steel code A, which is in the scope of the present invention, but a tempering temperature of less than 500° C., so the critical diffusable hydrogen amount is low and the delayed fracture properties are inferior. No. 18 is an example of increasing the strength of the conventional steel SCM435 to the 1400 MPa class, but the critical diffusable hydrogen amount is extremely low and the delayed fracture properties are inferior. No. 19, No. 20, and No. 21 are examples with amounts of addition of Mo less than the range of the present invention. Their critical diffusable hydrogen amounts are less than 0.5 ppm, and their delayed fracture properties are insufficient. In particular, No. 19 (steel code P) differs from No. 15 (steel code N) only in the amount of addition of Mo. The rest of the ingredients and the tempering conditions are almost the same in level. It is understood that due to the increase in Mo, regardless of the tensile strength increasing, the critical diffusable hydrogen amount is large and the delayed fracture properties are excellent. Further, No. 16 further raises the tempering temperature to make the tensile strength match that of the level of No. 19. The increase in Mo and the rise in the tempering temperature cause the critical diffusable hydrogen amount to further greatly increase and therefore the delayed fracture properties to be further improved.

As clear from these, satisfying all of the conditions prescribed in the present invention, compared with the comparative examples, gives a good delayed fracture resistance.

TABLE 1

| Steel | Composition of ingredients (mass %) | | | | | | | | | | | | | | | |
|---|---|---|---|---|---|---|---|---|---|---|---|---|---|---|---|---|
| code | C | Si | Mn | P | S | Cr | Mo | W | Ni | Cu | V | Al | Ti | Nb | B | N |
| Inv. steel A | 0.42 | 0.05 | 0.46 | 0.004 | 0.004 | | 4.03 | | | | 0.15 | 0.023 | | | | 0.0036 |
| B | 0.42 | 0.04 | 0.45 | 0.004 | 0.003 | | 3.02 | | | | 0.15 | 0.026 | | | | 0.0042 |
| C | 0.42 | 0.02 | 0.46 | 0.005 | 0.003 | | 5.62 | | | | 0.36 | 0.025 | | | | 0.0043 |
| D | 0.21 | 0.05 | 1.05 | 0.020 | 0.005 | | 10.00 | | | | 0.05 | 0.035 | | | | 0.0048 |
| E | 0.60 | 0.04 | 0.51 | 0.001 | 0.001 | | 3.10 | 0.01 | | | 0.35 | 0.027 | | | | 0.0052 |
| F | 0.20 | 0.03 | 3.00 | 0.003 | 0.020 | | 3.30 | 10 | | | | 0.031 | | | | 0.0035 |
| G | 0.40 | 0.50 | 0.11 | 0.005 | 0.005 | | 3.80 | | 1 | 0.05 | 0.20 | 0.100 | | | | 0.0032 |
| H | 0.39 | 0.07 | 0.55 | 0.004 | 0.002 | 0.1 | 4.50 | | | 0.5 | 0.15 | 0.022 | | | | 0.0039 |
| I | 0.40 | 0.01 | 0.48 | 0.005 | 0.005 | 2 | 3.50 | | | | 0.35 | 0.032 | | | | 0.0041 |
| J | 0.42 | 0.05 | 0.45 | 0.005 | 0.005 | | 4.00 | | | | 0.15 | 0.030 | 0.01 | 1 | | 0.0040 |
| K | 0.38 | 0.08 | 0.64 | 0.001 | 0.004 | | 5.80 | | 0.05 | | | 0.033 | 0.035 | | | 0.0110 |
| L | 0.40 | 0.02 | 0.53 | 0.009 | 0.001 | | 3.40 | | | | | 0.005 | 1 | | 0.0025 | 0.0010 |
| M | 0.43 | 0.09 | 0.51 | 0.002 | 0.002 | | 3.30 | | | | 1.00 | 0.045 | | 0.01 | | 0.0045 |
| N | 0.43 | 0.05 | 0.70 | 0.008 | 0.013 | | 3.30 | | | | | 0.041 | | | | 0.0034 |
| Comp. steel O | 0.36 | 0.17 | 0.69 | 0.020 | 0.014 | 0.95 | 0.17 | | | | | 0.026 | | | | 0.0037 |
| P | 0.43 | 0.05 | 0.71 | 0.008 | 0.012 | | 2.89 | | | | | 0.040 | | | | 0.0035 |
| Q | 0.52 | 0.04 | 0.46 | 0.005 | 0.003 | | 2.14 | | | | 0.16 | 0.027 | | | | 0.0036 |
| R | 0.42 | 0.04 | 0.45 | 0.005 | 0.003 | | 2.12 | | | | 0.36 | 0.028 | | | | 0.0034 |

TABLE 2

| | No. | Steel code | Quenching heating temperature (° C.) | Tempering temperature (° C.) | Tensile strength (MPa) | Critical diffusable hydrogen amount (ppm) |
|---|---|---|---|---|---|---|
| Inv. ex. | 1 | A | 1000 | 600 | 1904 | 0.9 |
| | 2 | A | 1000 | 660 | 1622 | 3.8 |
| | 3 | B | 1000 | 600 | 1866 | 0.7 |
| | 4 | C | 1000 | 625 | 2150 | 2.2 |
| | 5 | D | 1000 | 600 | 2235 | 2.9 |
| | 6 | E | 1000 | 600 | 2158 | 0.9 |
| | 7 | F | 1000 | 600 | 1957 | 3.3 |
| | 8 | G | 950 | 600 | 1876 | 2.2 |
| | 9 | H | 1000 | 600 | 1906 | 2.4 |
| | 10 | I | 1000 | 600 | 1954 | 3.2 |
| | 11 | J | 1000 | 600 | 1886 | 2 |
| | 12 | K | 1100 | 600 | 1930 | 2.6 |
| | 13 | L | 1000 | 600 | 1658 | 1.7 |
| | 14 | M | 1000 | 600 | 2420 | 2.0 |
| | 15 | N | 950 | 630 | 1801 | 1.1 |
| | 16 | N | 950 | 665 | 1711 | 3.1 |
| Comp. ex. | 17 | A | 1000 | 490 | 1962 | 0.35 |
| | 18 | O | 860 | 440 | 1445 | 0.02 |
| | 19 | P | 950 | 630 | 1710 | 0.48 |
| | 20 | Q | 1000 | 600 | 1795 | 0.5 |
| | 21 | R | 1000 | 600 | 1822 | 0.5 |

The invention claimed is:

1. A steel with an excellent delayed fracture resistance and a tensile strength of the 1801 MPa class or more consisting essentially of, by mass %,
   C: 0.20 to 0.60%,
   Si: 0.50% or less,
   Mn: over 0.10% to 3%,
   Al: 0.005 to 0.045%, in an amount effective to deoxidize and form nitrides to make pre-austenite grains finer, Cu: 0.05 to 0.30%, in an amount effective to improve corrosion resistance,
Mo: over 3.0% to 10%, and further consisting essentially of a quenched and tempered microstructure, treated by tempering at 600% to 750° C., containing fine Mo carbide precipitates, and a balance of Fe and unavoidable impurities.

2. The steel with an excellent delayed fracture resistance and a tensile strength of the 1801 MPa class or more as set forth in claim 1, further consisting essentially of, by mass %, one or more of
W: 0.01 to 10%,
V: 0.05 to 1%,
Ti: 0.01 to 1%, and
Nb: 0.01 to 1%.

3. The steel with an excellent delayed fracture resistance and a tensile strength of the 1801 MPa class or more as set forth in claim 1, further consisting essentially of, by mass %, one or more of
Cr: 0.10 to 2%,
Ni: 0.05 to 0.70%,
Cu: 0.05 to 0.30%, and
B: 0.0003 to 0.01%.

4. A steel, having an excellent delayed fracture resistance and a tensile strength in the 1801 MPa class or more, in accordance with claim 1, wherein the steel is shaped to a steel shaped article by a process comprising the steps of shaping the steel to a desired shape, then quenching it, and thereafter tempering it in temperature range of 600° to 750° C.

5. A steel, having an excellent delayed fracture resistance and a tensile strength in the 1801 MPa class or more, in accordance with claim 2, wherein the steel is shaped to a steel shaped article by a process comprising the steps of shaping the steel to a desired shape, then quenching it, and thereafter tempering it in temperature range of 600° to 750° C.

6. A steel, having an excellent delayed fracture resistance and a tensile strength in the 1801 MPa class or more, in accordance with claim 3, wherein the steel is shaped to a steel shaped article by a process comprising the steps of shaping the steel to a desired shape, then quenching it, and thereafter tempering it in temperature range of 600° to 750° C.

7. A bolt produced from the steel in accordance with claim 1, having an excellent delayed fracture resistance and a tensile strength in the 1801 MPa class or more.

8. A bolt produced from the steel in accordance with claim 2, having an excellent delayed fracture resistance and a tensile strength in the 1801 MPa class or more.

9. A bolt produced from the steel in accordance with claim 3, having an excellent delayed fracture resistance and a tensile strength in the 1801 MPa class or more.

* * * * *